May 5, 1925.
B. F. TRANER ET AL
EMERGENCY ANTISKID DEVICE
Filed April 16, 1923
1,536,362
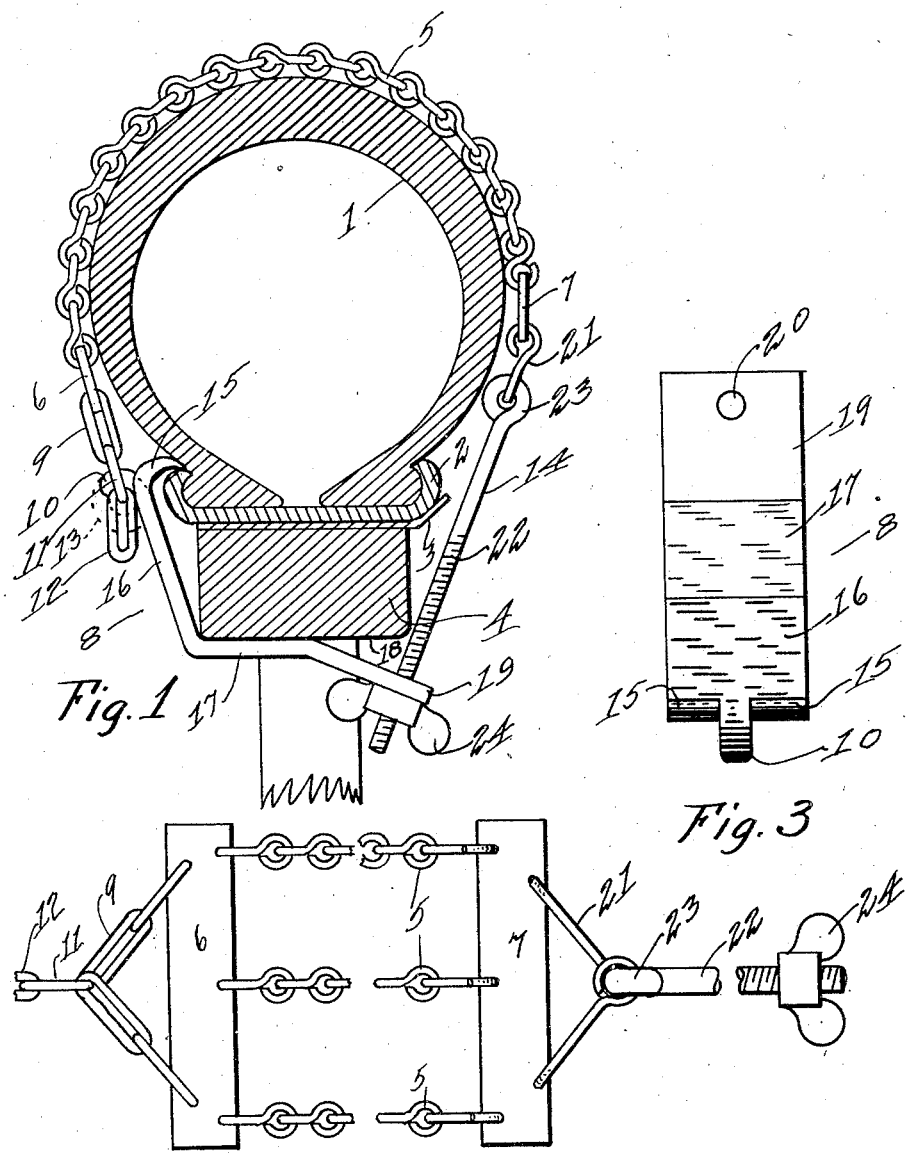
INVENTOR.
BENJAMIN F. TRANER AND
HARRY H. KNOX.
BY
ATTORNEYS.

Patented May 5, 1925.

1,536,362

UNITED STATES PATENT OFFICE.

BENJAMIN F. TRANER AND HARRY A. KNOX, OF COLLEGE PLACE, WASHINGTON; SAID KNOX ASSIGNOR TO SAID TRANER.

EMERGENCY ANTISKID DEVICE.

Application filed April 16, 1923. Serial No. 632,264.

*To all whom it may concern:*

Be it known that we, BENJAMIN F. TRANER and HARRY A. KNOX, citizens of the United States, residing at College Place, in the county of Walla Walla and State of Washington, have invented certain new and useful Improvements in Emergency Antiskid Devices, of which the following is a specification.

This invention relates to emergency antiskid devices, of the variety as used on automobiles, and has as one of its objects to provide a means that may be quickly and rigidly attached to a tire and wheel to prevent skidding, even under adverse circumstances.

Another object of the invention is to provide a means to prevent skidding that will not depend on the spoke of the wheel to prevent slipping or creeping, but rigidly grasps the rim with the tension of the device evenly distributed about the perimeter of the tire.

With these and other objects in view reference is had to the accompanying drawings in which Fig. 1 is a sectional transverse view of a tire, rim and felly of a wheel, with the device in place;

Fig. 2 is a plan view of the device with the hook plate removed; and

Fig. 3 is a plan view of the hook plate.

Having reference to the drawings like numerals refer to like parts throughout the several views and the numeral 1 refers to a tire mounted in the usual manner in a rim 2. A band 3 placed about the felly 4 holds the rim properly in place.

About the tire is a series or plurality of transverse chains 5, preferably three in number and equi-spaced, and attached to the ends of this chain are longitudinally disposed bars, 6 and 7 respectively, which together with the three chains 5 form a unit.

A hook plate 8 is attached to one of these bars 6 by means of stay chains 9, the hook plate being provided with a hook 10 to engage either one of the links 11 and 12 used for adjustment purposes.

Now, while we have shown and described this engaging means as a hook, obviously a ring, as shown by the dotted lines at 13, could be employed as the tension may be wholly taken up by a bolt 14 without the necessity of using the hook as an adjustment feature.

The hook plate 8 comprises in addition to the hook 10, a pair of rim hooks 15 which are designed to engage the rim 2 as shown in Fig. 1. A shank 16 depends from the hooks, and being bent forms a shoulder 17 to seat against the inner side 18 of the felly 4; and further continuing forms an offset 19, which offset is designed perpendicular to the axis of the above mentioned bolt 14 for engagement therewith, and is provided with a bolt hole 20 for the purpose. It may here be stated that a slot may be substituted for the hole 20 if deemed advisable.

Both stay chains are preferably centered at the hook 10, or the point of attachment of the bolt, respectively, and diverging engage their respective bar, so that the tension exerted by the bolt will be equally distributed about the tire.

Attached to the bar 7 by means of the stay chains 21 is the above mentioned bolt 14 which will now be explained:

This bolt comprises a shank 22 on one end of which is a ring 23 engageable with the stay chain 21, and on the other end of the bolt is a wing nut 24 in threaded engagement with the bolt, and thus provides an adjustable fastening feature.

In use the hooks 15 are forcibly placed in engagement with the rim 2 and the shoulder 17 is brought under the felly 4 which it now engages. The unit is now laid over the tire 1 the bolt 14 brought into engagement with the hook plate 8, through the hole 20, and the wing nut 24 tightened to a proper tension depending on the inflation of the tire.

It will be noted by reference to Fig. 1 that the shank 16 and the stay chain 9 leave the tire 1 at a tangent, as does also the bolt 14. By this means I am enabled to maintain the hooks 15 in engagement with the rim 2 even under severe duty, while were the shank brought closer to the rim, with the hooks 15 necessarily decreased in size, a severe strain as with a heavy load on a soft tire, might bend the shank and cause the hook to become disengaged.

Having thus described our invention, we claim:

1. An emergency anti-skid device comprising equi-spaced transverse chains, longitudinally disposed bars attached to each end of said chains, and forming with said chains a unit, a hook plate attached to said unit and engageable with the rim and felly of a wheel, and a bolt attached to said unit and engageable with said hook plate.

2. An emergency anti-skid device comprising transverse chains, longitudinally disposed bars attached to each end of said chains to form with said chains a unit, a hook plate adjustably attached to said unit and engageable with the rim and felly of a wheel, and a bolt attached to said unit and engageable with said hook plate.

3. An emergency anti-skid device comprising equi-spaced transverse chains, longitudinally disposed bars attached to each end of said chains to form with said chains a unit, a hook plate attached to said unit and comprising rim hooks formed on one end thereof and engageable with the rim of a wheel, a shoulder engageable with the inner side of the felly of said wheel, with an offset at the other end of said plate engageable with a bolt, said bolt being attached to said unit to engage said hook plate.

4. An emergency anti-skid device comprising a plurality of transverse chains, longitudinally disposed bars attached to the ends of said chains to form a unit, a hook plate engageable with the rim and felly of a wheel, stay chains connecting one of said bars with the hook plate, a bolt adjustably engageable with the hook plate, and stay chains connecting the other of said bars with said bolt.

In testimony whereof we affix our signatures.

BENJAMIN F. TRANER.
HARRY A. KNOX.